United States Patent
Hayashi

(10) Patent No.: US 6,369,927 B2
(45) Date of Patent: *Apr. 9, 2002

(54) OPTICAL SCANNING APPARATUS

(75) Inventor: Yoshinori Hayashi, Kawasaki (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/239,686

(22) Filed: Jan. 29, 1999

(30) Foreign Application Priority Data

Feb. 13, 1998 (JP) .............................. 10-031661
Apr. 6, 1998 (JP) .............................. 10-093457

(51) Int. Cl.$^7$ ................................ G02B 26/08
(52) U.S. Cl. ................ 359/196; 359/197; 359/212; 359/205; 359/207; 359/820; 347/256
(58) Field of Search ................. 359/212, 216, 359/219, 196, 197, 205, 207, 820; 347/256, 258, 259

(56) References Cited

U.S. PATENT DOCUMENTS 5,966,232 A * 10/1999 Kimura et al. .............. 359/205
6,057,953 A * 5/2000 Ang ........................... 359/204

FOREIGN PATENT DOCUMENTS

| JP | 7-128604 | 5/1995 |
| JP | 8-292388 | 5/1996 |
| JP | 8-160330 | 6/1996 |

* cited by examiner

Primary Examiner—Darren Schuberg
Assistant Examiner—Fayez Assaf
(74) Attorney, Agent, or Firm—Greenberg Traurig, LLP

(57) ABSTRACT

An optical scanning apparatus for optically scanning a surface to be scanned at a constant velocity includes a light source for emitting a light flux, a first optical lens system for coupling the light flux emitted by the light source to a subsequent optical lens system, a second optical lens system for forming the light flux received from the first optical lens system into a line image extending in a direction corresponding to a main scanning direction for the surface to be scanned, an optical deflector for deflecting the light flux formed as the line image via a deflecting reflective plane thereof, which is located near where the line image is formed, and a third optical lens system for condensing the deflected light flux as an optical beam spot on the surface to be scanned. The second optical lens system includes at least one plastic lens and one glass lens, and a surface of the at least one plastic lens of the second optical lens system is configured such that a change in a curvature of field in directions corresponding to the main scanning direction and the sub scanning direction, respectively, which is caused by a change in the plastic lens of the third optical lens system due to changes in an operating temperature, is corrected and compensated.

15 Claims, 6 Drawing Sheets

FIG.2(a) Constant velocity characteristics, image height 108mm
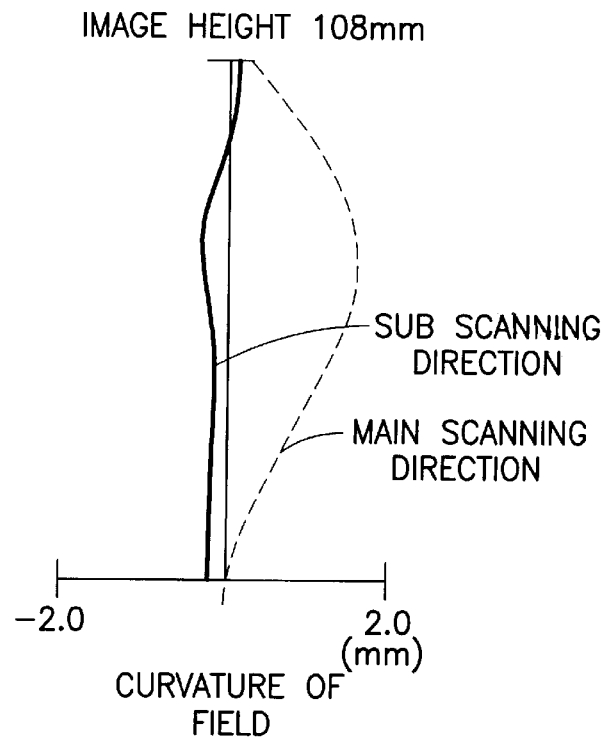
FIG.2(b) Curvature of field, image height 108mm
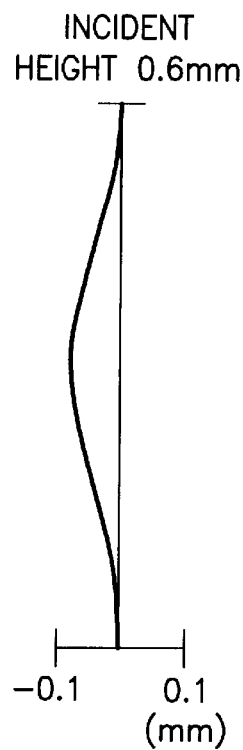
FIG.3 Incident height 0.6mm

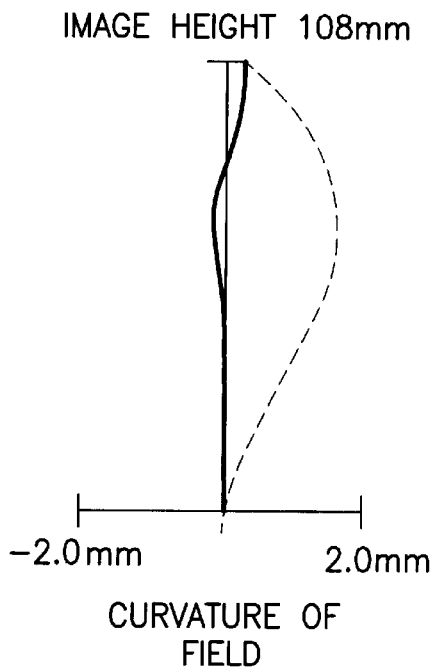
FIG.7(a) CURVATURE OF FIELD
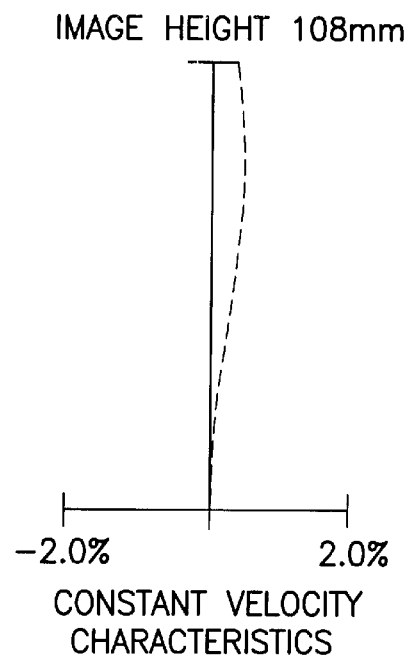
FIG.7(b) CONSTANT VELOCITY CHARACTERISTICS
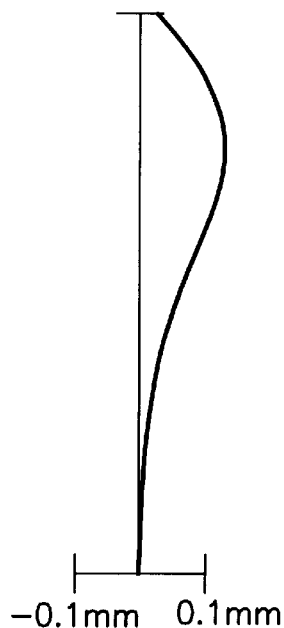
FIG.8 EXAMPLE 1 INCIDENT HEIGHT 1.2mm

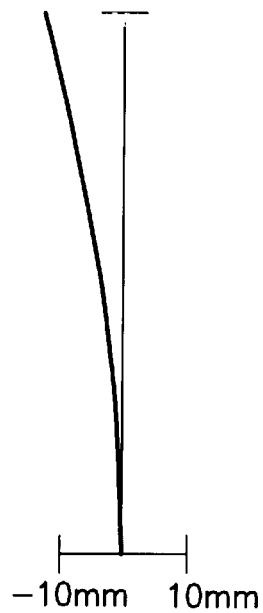
FIG.9 — INCIDENT HEIGHT 1.2mm, −10mm 10mm
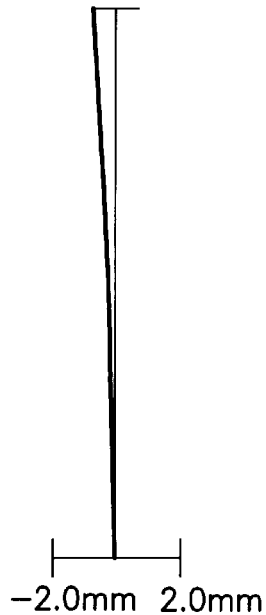
FIG.10 — EXAMPLE 1 INCIDENT HEIGHT 2.0mm, −2.0mm 2.0mm
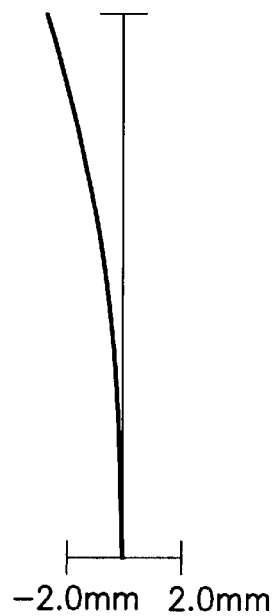
FIG.11 — COMPARATIVE EXAMPLE 2 INCIDENT HEIGHT 2.0mm, −2.0mm 2.0mm

OPTICAL SCANNING APPARATUS

BACKGROUND OF THE INVENTION

1. Field of the Invention

The present invention relates to an optical scanning apparatus, and more particularly to an optical scanning apparatus which is constructed to correct a change in the curvature of field of a lens caused by an operating temperature change so as to form a small-diameter optical beam spot on a surface to be scanned regardless of changes in the operating temperature.

2. Description of Related Art

An optical scanning apparatus is often provided in laser printers, digital copying machines or facsimile machines. It is also well known to use plastic material for manufacturing a lens to reduce the cost of the lens or to form a surface of the lens so as to have a specific shape. For a scanning image forming lens used for forming a deflected light flux into an image on a scanning surface, there are proposed various lens shapes for correcting the curvature of field and the constant velocity characteristics, and plastic material is known to be suitable for forming such lens shapes to achieve such correction of curvature of field.

The curvature of field and the refractive index of the surface of a plastic lens both change in accordance with a change in the volume of the lens due to an operating temperature change. As a result, the lens performance and especially the curvature of field changes in accordance with changes in the operating temperature. A change of the curvature of field causes an increase in the diameter of an optical beam spot formed on a scanning surface, and consequently, lowers the resolution of optical scanning and images formed by such scanning.

A change of the curvature of field of a plastic lens caused by a temperature change occurs in an opposite manner in positive and negative lenses. Accordingly, a change of the curvature of field of a plastic scanning image forming lens caused by a temperature change can be corrected by arranging another plastic lens having a power opposite to that of the scanning image forming lens along an optical path between a light source and an optical deflector. Such an arrangement offsets the change in the curvature of field of the plastic scanning image forming lens by having a suitable change in the curvature of field of another plastic lens, as disclosed in Japanese Patent Laid-open Publication Nos. 8-160330 and 8-292388.

In the optical scanning apparatus described in JP 8-160330 and 8-292388, the plastic lens arranged between the light source and the optical deflector does not have a power relative to a direction corresponding to a main scanning direction. Therefore, the plastic lens arranged between the light source and the optical deflector does not correct a change of the curvature of field in the direction corresponding to the main scanning direction which is caused by the changes in operation temperature. As a result, an increase in the diameter of the optical beam spot in the main scanning direction cannot be prevented. The direction corresponding to a main scanning direction herein refers to the direction corresponding a scanning direction of an optical scanning apparatus along an optical path from a light source to a scanning surface and the direction corresponding to a sub scanning direction refers to a direction corresponding to a sub scanning direction of the optical scanning apparatus along the same light path, which is substantially perpendicular to the main scanning direction.

Further, for preventing an increase of an optical beam spot diameter in the sub scanning direction, it is known that wave-front aberration must be considered not only for paraxial light fluxes but also for the entire light fluxes.

SUMMARY OF THE INVENTION

Preferred embodiments of the present invention overcome the problems described above by providing an optical scanning apparatus, which is constructed and arranged to include a plastic lens for a scanning image forming lens for forming a deflected light flux into an image on a scanning surface such that the plastic lens corrects any change in the curvature of field in both the main scanning direction and the sub scanning direction, which change in curvature of field is caused by a change in operating temperature, and to consequently form an optical beam spot having a very small diameter on the scanning surface regardless of changes in the operating temperature.

The preferred embodiments of the present invention also provide an optical scanning apparatus which is constructed to correct an effect of the change in the curvature of field relative to the paraxial light fluxes in the sub scanning direction and also to correct the wave-front aberration relative to the entire light fluxes in the sub scanning direction.

According to a specific preferred embodiment of the present invention, an optical scanning apparatus includes a light source, a first optical lens system, a second optical lens system, an optical deflector and a third optical lens system. A semiconductor laser or a light emitting diode (LED) may be used as the light source. The first optical lens system couples a divergent light flux emitted from the light source to a subsequent optical lens system, which is the second optical lens system. The first optical lens system converts the light flux emitted from the light source either to a parallel light flux or to a weak converging or weak diverging light flux. The second optical lens system forms the light flux emerged from the first optical lens system into a line image extending in a direction corresponding to the main scanning direction. The optical deflector has a deflecting reflective surface located near where the line image is formed and deflects the light flux reflected by the deflecting reflective surface. A rotating polygonal mirror, a rotating single-surface mirror or a rotating double-surface mirror may be used for the optical deflector. The third optical lens system condenses the deflected light flux on a surface to be scanned as an optical beam spot so as to scan the surface to be scanned. The third optical lens system preferably includes at least one plastic lens. The third optical lens system may include two or more lenses, or may be constructed by a combination of one or more lenses and a concave-shaped mirror having an image forming function. A flat-surface mirror may be arranged to bend a light path for the deflected light flux, in addition to the third optical lens system, between the optical deflector and the surface to be scanned, depending upon the arrangement of the optical scanning apparatus. The second optical lens system preferably includes at least one plastic lens and one glass lens.

According to one feature of preferred embodiments of the present invention, the surface of the plastic lens in the second optical lens system is formed such that a change in the curvature of field in the main scanning direction and in the sub scanning direction caused by a change in the volume of the plastic lens in the third optical lens system, which is caused by a change in the operating temperature, is accurately and completely corrected. Accordingly, the change in the curvature of field in the main scanning direction and the sub scanning direction, which is caused by changes in the operating temperature, is substantially prevented and thereby the diameter of the optical beam spot is kept very small.

In the above described optical scanning apparatus, the plastic lens of the third optical lens system may be configured to have a positive power in both directions corresponding to the main scanning direction and the sub scanning direction, respectively, and the plastic lens of the second optical lens system may be configured so as to be an anamorphic lens having a negative power in both directions corresponding to the main scanning direction and the sub scanning direction and the glass lens of the second optical lens system may be configured to have a positive power at least in the sub scanning direction. By constructing the second optical lens system as described above to achieve a synergistic effect of the glass and plastic lenses, the characteristics required for the second optical lens system can be distributed between the glass and plastic lenses. More specifically, the plastic lens of the second optical lens system is arranged and constructed to eliminate any effects of changes in the curvature of field in the third optical lens system caused by changes in an operating temperature. As a result, the design of the second optical lens system can be greatly facilitated and the excellent performance of the second optical lens system can be achieved relatively easily.

Further, the plastic lens of the second optical lens system may include at least one surface which has a non-arc shape in the sub scanning cross section. As a result, changes in the curvature of field in the main scanning direction and the sub scanning direction caused by changes in the operating temperature are substantially prevented and further, the spherical aberration in the sub scanning direction is reduced. Accordingly, the diameter of the optical beam spot is kept very small and has a much more uniform and constant size.

In one embodiment a center portion of the non-arc shape is defined by the relationship: $\Delta1-\Delta2<0$, wherein $\Delta1$ is the difference between a reference arc shape and the non-arc shape at a first surface of the at least one plastic lens located at a side of the light source, and $\Delta2$ is the difference between a reference linear shape and a linear shape at a second surface of the at least one plastic lens located at a side of the surface to be scanned. In an alternate embodiment of the non-arc shape is defined by the relationship $\Delta1-\Delta2<0$, wherein $\Delta1$ is a difference between a reference linear shape and a linear shape at a first surface of the at least one plastic lens located at a side of the light source, and $\Delta2$ is the difference between a reference arc shape and the non-arc shape at a second surface of the at least one plastic lens located at a side of the surface to be scanned. It is also possible for the plastic lens of the second optical lens system to include at least one surface which has a non-arc shape in both the main scanning direction and the sub scanning direction.

Furthermore, the plastic lens of the second optical lens system may include a surface which has a symmetrical shape relative to the optical axis and which has a negative power. Thereby, treatment and measurement of the plastic lens are facilitated and the eccentric tolerance of the plastic lens is increased.

According to another specific preferred embodiment of the present invention, the third optical lens system functioning as a scanning image forming lens includes at least one plastic lens which has a positive power at least in the direction corresponding to the sub scanning direction. The second optical lens system includes at least one plastic lens and one glass lens as in the above described preferred embodiment. The plastic lens preferably has a negative power at least in the direction corresponding to the sub scanning direction and has at least one surface having a non-arc shape in the sub scanning cross section. The glass lens preferably has a positive power at least in the sub scanning direction. Therefore, any change in the curvature of field in the sub scanning direction caused by changes in the operation temperature is substantially prevented and the spherical aberration in the sub scanning direction is greatly decreased. Accordingly, the diameter of the optical beam spot is kept very small.

Further, in any of the above described preferred embodiments, the third optical lens system may be constructed by one plastic anamorphic lens having positive powers which are different in the main scanning direction and the sub scanning direction and the second optical lens system may be constructed to include one plastic and one glass lenses. Thus, the total number of lenses in the optical scanning apparatus may be reduced and consequently, the construction and the assembly of the optical scanning apparatus are simplified and the cost of the apparatus is significantly decreased. Moreover, because the plastic lens can be made by a mold and can be easily formed to have a desired shape, it is relatively easy to form the plastic lens so as to have a desired non-arc shape.

According to still another specific preferred embodiment of the present invention, the third optical lens system includes at least one plastic lens having a positive power at least in the direction corresponding to the sub scanning direction. The second optical lens system is configured to include at least two lenses, one made of plastic and the other made of glass. The plastic lens of the second optical lens system preferably has a negative power in the direction corresponding to the sub scanning direction, and in addition, has at least one surface having a non-arc shape in the main scanning cross section and one surface having a non-arc shape in the sub scanning cross section. The glass lens has a positive power at least in the direction corresponding to the sub scanning direction. The glass lens may have a power in the direction corresponding to the main scanning direction also. Because of the above configuration including the surface having a non-arc shape in the main scanning direction, the plastic lens of the second optical lens system also has a power in the main scanning direction.

The above power of the plastic lens of the second optical system in the direction corresponding to the main scanning direction may be set so as to be opposite to that of the plastic lens of the third optical lens system. That is, the plastic lens of the second optical lens system may include a negative power in the direction corresponding to the main scanning direction also. When the plastic lens of the second optical lens system includes a negative power in the direction corresponding to the main scanning direction, the plastic lens of the third optical lens system (scanning image forming lens) is positive.

In the preferred embodiment described in the previous paragraph, the plastic lens of the second optical lens system may be configured so as to include a surface having a negative power only in the direction corresponding to the sub scanning direction and a non-arc shape in the sub scanning cross section and a surface having a negative power only in the direction corresponding to the main scanning direction and a non-arc shape in the main scanning cross section. Further, the plastic lens of the second optical lens system may be configured to have a surface having a negative power only in the direction corresponding to the sub scanning direction and a non-arc shape in the sub scanning cross section, and a coaxial non-spherical surface, which is formed to have a symmetrical shape relative to the optical axis.

These and other features, advantages and elements of the present invention will be apparent from the following detailed description of the preferred embodiments with reference to the accompanying drawings as described below.

BRIEF DESCRIPTION OF THE DRAWINGS

FIGS. 2(a) and 2(b) are diagrams illustrating the curvature of field and the constant velocity characteristics of a first example of preferred embodiments of the present invention, respectively;

FIG. 3 is a diagram illustrating a spherical aberration of an optical beam spot at a zero image height of a second example of the preferred embodiments of the present invention;

FIGS. 7(a) and 7(b) are diagrams illustrating the curvature of field and the constant velocity characteristics at an operating temperature of about 20 degrees centigrade of a fourth example of the preferred embodiments, respectively;

FIG. 8 is diagram illustrating the spherical aberration in the sub scanning cross section of the fourth example shown in FIG. 7;

FIG. 9 is diagram illustrating the spherical aberration in the sub scanning cross section of a comparative example 1 for comparison to the fourth example;

FIG. 10 is diagram illustrating the spherical aberration in the main scanning cross section of the fourth example shown in FIG. 7;

FIG. 11 is a diagram illustrating the spherical aberration in the main scanning cross section of a comparative example 2 for comparison to the fourth example shown in FIG. 7;

DETAILED DESCRIPTION OF PREFERRED EMBODIMENTS

Specific preferred embodiments of the present invention will now be described.

Figure 1:
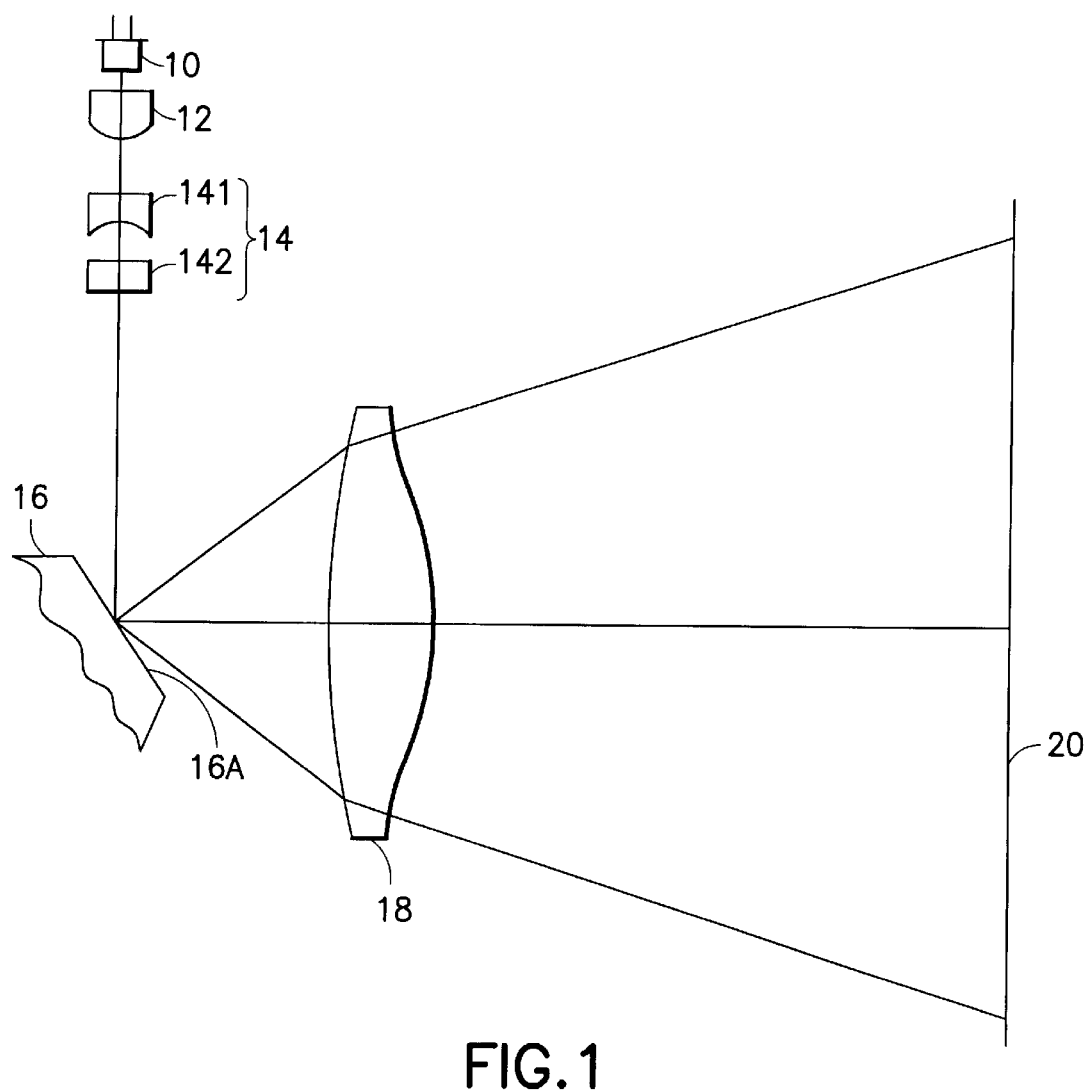
FIG. 1 is a diagram illustrating a preferred embodiment of an optical scanning apparatus of the present invention.

In FIG. 1 which illustrates a preferred embodiment of an optical scanning apparatus in accordance with the present invention, a semiconductor laser as a light source 10 emits a laser flux preferably having a wave length of about 780 nm at about 20 degrees centigrade, for example. A first optical lens system 12 couples a divergent light flux from the light source 1 to a subsequent optical system. The first optical lens system 12 may preferably be constructed by a glass lens, which is hardly influenced by operating environment conditions, such as temperature. Further, the first optical lens system 12 preferably may be formed to have a non-spherical shape for preventing spherical aberration.

A second optical lens system 14 preferably includes a plastic lens 141 and a glass lens 142, and condenses a light flux incident from the first lens system 12 so as to form a line image which extends in a direction corresponding to the main scanning direction. The plastic lens 141 preferably has a negative power in both directions corresponding to the main scanning direction and the sub scanning direction, respectively, and the glass lens 141 preferably has a positive power at least in the direction corresponding to the sub scanning direction. That is, the glass lens 142 preferably has a positive power which is greater than the negative power of the plastic lens 141 in the direction corresponding to the sub scanning direction, and the second optical lens system 14 as a whole has a positive power for forming the above-described line image extending in a direction corresponding to the main scanning direction.

An optical deflector 16 preferably includes a rotating polygon mirror having a deflecting reflective surface 16A located near where the line image is formed, and rotates at a constant speed so as to deflect a light flux reflected by the deflecting reflective surface 16A at equiangular velocity.

A third optical lens system 18 which functions as a scanning image forming lens preferably includes a single plastic lens, and condenses a deflected light flux so as to form an optical beam spot on a scanning surface 20, which is a surface to be scanned. The third optical lens system 18 enables the scanning surface to be scanned 20 by the optical beam spot at constant velocity. The third optical lens system 18 further enables the line image to be formed at the position of the scanning surface 20 with the line image as the object point in the direction corresponding to the sub scanning direction. The third optical lens system 18 is preferably an anamorphic lens having a larger positive power in the direction corresponding to the sub-scanning direction than in the direction corresponding to the main scanning direction. Because the third optical lens system 18 is a single plastic lens, when the operating temperature changes, the image forming position defined by the third optical lens system 18 significantly changes for both directions corresponding to the main scanning direction and the sub scanning direction.

For example, when the temperature increases, the image forming position defined by the third optical lens system 18 changes in a positive direction (to the right in FIG. 1) for both directions corresponding to the main scanning direction and the sub scanning direction, respectively. In this preferred embodiment, therefore, for offsetting the above change in the image forming position of the third optical lens system 18 caused by the temperature change, the plastic lens 141 having a negative power in both directions corresponding to the main scanning direction and the sub scanning direction, respectively, is used in the second optical lens system 14. The plastic lens 141 changes the image forming position in a negative direction (to the left in FIG. 1) for both directions corresponding to the main scanning direction and the sub scanning directions, respectively, when the temperature rises. Accordingly, the change in the image forming position defined by the third optical lens system 18 in the positive direction is offset by the change in the image forming position by the plastic lens 141 in the negative direction. Thus, even when the operating temperature changes, the diameter of an optical beam spot is kept very small on the surface to be scanned.

Five examples of preferred embodiments will be explained herein below. The optical arrangement is preferably substantially the same for all of the examples as illustrated in FIG. 1

EXAMPLE 1

The radius of curvature R, the lens thickness D at a center portion thereof, the refractive index N at an operating wave length, and the non-spherical surface coefficient of each optical element at the operating temperature of about 20 degrees and about 50 degrees centigrade are shown below. For each optical lens, the incident surface is indicated by a suffix "1" and the emerging surface by a suffix "2". When the radius of curvature differs between the directions corresponding to the main scanning direction and the sub scanning direction, respectively, the radius of curvature for the direction corresponding to the main scanning direction is indicated by a suffix "m" and the radius of curvature for the direction corresponding to the sub scanning direction by a suffix "s".

| Operating temperature (centigrade) | | 20 | 50 |
|---|---|---|---|
| Light source operating wave length (nm) | | 780.0 | 787.8 |
| The first optical lens system: (coupling lens) | Object point | 0 | −0.01001 |
| | $R_1$ | ∞ | ∞ |
| | $R_2$ | −9.761 | −9.763 |
| | D | 2.800 | 2.801 |
| | N | 1.675 | 1.6748 |
| The second optical lens system: (plastic lens) | $R_{1m}$ | ∞ | ∞ |
| | $R_{1s}$ | −14.80 | −14.831 |
| | $R_2$ | 90.00 | 90.189 |
| | D | 3.000 | 3.006 |
| | N | 1.5244 | 1.52165 |
| The second optical lens system: (glass lens) | $R_{1m}$ | ∞ | ∞ |
| | $R_{2m}$ | ∞ | ∞ |
| | $R_{1s}$ | 9.520 | 9.5221 |
| | $R_{2s}$ | ∞ | ∞ |
| | D | 3.000 | 3.001 |
| | N | 1.511249 | 1.511160 |
| The third optical lens system: (scanning image forming lens) | $R_{1m}$ | 155.000 | 155.326 |
| | $R_{1A4}$ | −9.46500E−07 | −9.40562E−07 |
| | $R_{1A6}$ | 3.85000E−10 | 3.80983E−10 |
| | $R_{1A8}$ | −8.11300E−14 | −7.99473E−14 |
| | $R_{1A10}$ | 1.00000E−17 | 9.81297E−18 |
| | $R_{1s}$ | −88.850 | −89.037 |
| | D | 13.500 | 13.528 |
| | N | 1.524400 | 1.521650 |
| | $R_{2m}$ | −141.000 | −141.296 |
| | $R_{2A4}$ | −1.00300E−06 | −9.96708E−07 |
| | $R_{2A6}$ | 2.44000E−10 | 2.41454E−10 |
| | $R_{2A8}$ | −7.85600E−14 | −7.74148E−14 |
| | $R_{2A10}$ | 2.80000E−17 | 2.74763E−17 |
| | $R_{2s}$ | −15.220 | −15.252 |

In the above example, assuming that i=1 (incident surface) −2 (emerging surface), $R_{im}$ represents the radius of curvature or paraxial radius of curvature in the direction corresponding to the main scanning direction, $R_{is}$ represents the radius of curvature or paraxial radius of curvature in the direction corresponding to the sub-scanning direction, $R_i$ represents the radius of curvature in the coaxial surface, and $R_{iA4}$–$R_{iA10}$ represent the non-spherical surface coefficient, respectively. Further, "E and the value following E" in a numerical value represents the power of 10; e.g., "E−9" means 10−9, the numerical value being applied to the number immediately preceding it.

In the first example, both incident and emerging surfaces of the scanning image forming lens which functions as the third optical lens system preferably have a non-arc shape in the horizontal cross section that is substantially parallel to the direction corresponding to the main scanning direction including the optical axis (herein referred to as the main scanning cross section). The non-arc shape is expressed in the following formula (1), which is widely known as a formula of a non-arc surface, wherein X is the coordinate in the direction of the optical axis, Y is the coordinate in the main scanning direction (perpendicular to the optical axis), $R_{im}$ is the paraxial radius of curvature, $K_i$ is the cone constant, and $R_{iA4}$, $R_{iA6}$, $R_{iA8}$, $R_{iA10}$ are respectively coefficients of higher degree:

$$X = Y^2 / \left[ R_{im} + \left[ R_{im}\sqrt{1-(1+K_i)Y^2/R_{im}^2} \right] \right] + \{R_{iA4}Y^4 + R_{iA6}Y^6 + R_{iA8}Y^8 + R_{iA10}Y^{10}\} \quad (1)$$

The cone constants $K_1$ and $K_2$ of the first and second surfaces of the scanning image forming lens as the third optical lens system are −59.97 and 4.69, respectively.

Further, the radius of curvature in the sub scanning cross section of the third optical lens system (scanning image forming lens) at each position of the coordinate Y in the direction corresponding to the main scanning direction is expressed by the following polynomial:

$$r_{is}(Y) = R_{is} + a_i Y^2 + b_i Y^4 + c_i Y^6 + d_i Y^8 + e_i Y^{10} + f_i Y^{12} \quad (2)$$

wherein $R_{is}$ is the radius of curvature when Y=0, and $R_{1s}$=−88.850 and $R_{2s}$=−15.220 at the operating temperature of about 20 degrees centigrade.

In the incident surface (i=1) of the third optical lens system, $a_1 = b_1 = c_1 = \ldots = 0$, that is, the radius of curvature in the sub scanning cross section does not change, and in the emerging surface (i=2), $a_2$=−2.2076E−03, $b_2$=2.43846E−06, $c_2$=−2.72962E−10, $d_2$=−1.13767E−12, $e_2$=1.0764E−15, $f_2$=−3.11961E−19.

Next, the optical arrangement on the light path from the second optical lens system to the scanning surface is described.

The light flux emerging from the first optical lens system (coupling lens) is a weak converging light flux. That is, the first optical lens system converts a divergent light flux from the light source into a weak converging light flux. The position where the converging light flux is naturally condensed (without passing through the other optical lens) is called a natural condensing point.

The optical arrangement of the first example is defined by the following values, wherein "S" is the distance from the incident surface of the second optical lens system to the natural condensing point, "L1" is the distance from the emerging surface of the first plastic lens of the second optical lens system to the incident surface of the second glass lens of the second optical lens system, "L2" is the distance from the emerging surface of the second lens of the second optical lens system to the deflecting reflective surface of the optical deflector, "L3" is the distance from the deflecting reflective surface of the deflector to the incident surface of the third optical lens system (the scanning image forming lens) and "L4" is the distance from the third optical lens system to the scanning surface, respectively:

S: 174.3 mm
L1: 4 mm
L2: 40 mm
L3: 33.2 mm
L4: 139.3 mm

The semiconductor laser of the light source and the first optical lens system functioning as the coupling lens are preferably packaged in a common aluminum tube. Because the coefficient of linear expansion of aluminum is 2.3E−05

(/° C.), assuming that the focal length of the first optical lens system is about 14.5 mm, the object point of the first optical lens system moves away from the first optical lens system by the distance of about 0.01001 mm, which is calculated by the equation of 2.3E−05×30×14.5.

Further, the coefficient of linear expansion of the other optical elements are as follows, respectively;
The first optical lens system (coupling lens): 8.6E−06
The first lens (plastic lens) of the second optical lens system: 7.0E−05
The second lens (glass lens) of the second optical lens system: 7.5E−06
The third optical lens system (scanning image forming lens): 7.0E−05

FIG. 2 illustrates the curvature of field and the constant velocity characteristics of the optical scanning apparatus of the first example at an operating temperature of about 20 degrees centigrade. As illustrated, both the curvature of field and the constant velocity characteristics are accurately and completely corrected.

The change in the curvature of field in the main and sub scanning directions in the first example when the operating temperature is changed from about 20 degrees to about 50 degrees centigrade are as follows:

|  | 0 mm | | 108 mm | |
| --- | --- | --- | --- | --- |
| Image height | main | sub | main | sub |
| Curvature of field change by the first optical lens system | −0.1 | −0.1 | −0.1 | −0.1 |
| Curvature of field change by the first lens of the second optical lens system | −0.9 | −3.7 | −0.6 | −3.1 |
| Curvature of field change by the second lens of the second optical lens system | 0.0 | 0.5 | 0.0 | 0.4 |
| Curvature of field change by the third optical lens system | 1.1 | 4.1 | 1.0 | 3.5 |
| Curvature of field change as the whole lens system | 0.1 | 0.8 | 0.3 | 0.7 |

Thus, although the curvature of field changes in the positive direction both in the main scanning direction and the sub scanning direction caused by a change in the volume of the plastic lens in the third optical lens system in accordance with a change in the operating temperature, because the curvature of field changes in the negative direction both in the main scanning direction and the sub scanning direction due to a change in the volume of the first lens of the second optical lens system in accordance with changes in the operating temperature, the total change in the curvature of field of the whole optical lens system is suppressed in both the main scanning direction and the sub scanning direction despite changes in the operating temperature.

Further, in this first example of the preferred embodiments, the first lens (plastic lens) of the second optical lens system is an anamorphic lens having a negative power in both directions corresponding to the main scanning direction and the sub scanning direction, respectively, and the emerging surface of the first lens preferably has a concave shape and is symmetrically relative to the optical axis. Because of the symmetrical shape, treatment and measurement of the emerging surface of the first lens are facilitated, and further the relative eccentric tolerance of each surface, particularly, around the optical axis, is increased.

EXAMPLE 2

The second example of the preferred embodiments is described next.

As described earlier, in order to keep the diameter of the optical beam spot small, not only the paraxial imaging forming performance but also the spherical aberration (wave-front aberration) on the scanning surface must be accurately and completely corrected.

Therefore, the plastic lens of the third optical lens system is preferably configured to have a positive power at least in the direction corresponding to the sub scanning direction, and the plastic lens of the second optical lens system is preferably configured to have a negative power at least in the direction corresponding to the sub scanning direction. Further, the plastic lens of the second optical lens system includes at least one surface having a non-arc shape in the sub scanning cross section, and the glass lens of the second optical lens system has a positive power at least in the sub scanning direction. That is, at least one surface of the plastic lens is formed to be non-arc in the sub scanning cross section for correcting the spherical aberration (wave-front aberration) on the scanning surface.

The radius of curvature R, the lens thickness D, the refractive index N at an operating wave length, and the non-spherical surface coefficient of each optical lens at about 20 degrees and about 50 degrees centigrade are shown below in a similar manner as in Example 1.

| | | 20 | 50 |
| --- | --- | --- | --- |
| Operating temperature (centigrade) | | | |
| Light source operating wave length (nm) | | 780.0 | 787.8 |
| The first optical lens system: (coupling lens) | Object point | 0 | −0.01001 |
| | $R_1$ | ∞ | ∞ |
| | $R_2$ | −9.761 | −9.763 |
| | D | 2.800 | 2.801 |
| | N | 1.675 | 1.6748 |
| The second optical lens system: (plastic lens) | $R_{1s}$ | −15.00 | −15.032 |
| | $R_{2s}$ | ∞ | ∞ |
| | D | 3.000 | 3.006 |
| | N | 1.5244 | 1.52165 |
| The second optical lens system: (glass lens) | $R_{1m}$ | ∞ | ∞ |
| | $R_{2m}$ | ∞ | ∞ |
| | $R_{1s}$ | 9.685 | 9.6872 |
| | $R_{2s}$ | ∞ | ∞ |
| | D | 3.000 | 3.001 |
| | N | 1.511249 | 1.511160 |
| The third optical lens system: (scanning image forming lens) | $R_{1m}$ | 155.000 | 155.326 |
| | $R_{1A4}$ | −9.46500E−07 | −9.40562E−07 |
| | $R_{1A6}$ | 3.85000E−10 | 3.80983E−10 |
| | $R_{1A8}$ | −8.11300E−14 | −7.99473E−14 |
| | $R_{1A10}$ | 1.00000E−17 | 9.81297E−18 |
| | $R_{1s}$ | −88.850 | −89.037 |
| | D | 13.500 | 13.528 |
| | N | 1.524400 | 1.521650 |
| | $R_{2m}$ | −141.000 | −141.296 |
| | $R_{2A4}$ | −1.00300E−06 | −9.96708E−07 |
| | $R_{2A6}$ | 2.44000E−10 | 2.41454E−10 |
| | $R_{2A8}$ | −7.35600E−14 | −7.74148E−14 |
| | $R_{2A10}$ | 2.80000E−17 | 2.74763E−17 |
| | $R_{2s}$ | −15.220 | −15.252 |

The first plane (incident surface) of the first lens (plastic lens) of the second optical lens system has a non-arc shape in the sub scanning cross section. The non-arc shape is expressed in the following formula (3), wherein X is the coordinate in the direction of the optical axis, Z is the coordinate in the sub scanning direction (perpendicular to the optical axis), $R_s$ is the paraxial radius of curvature, K is the cone constant, and $a_4$, $a_6$, $a_8$, $a_{10}$, . . . are coefficients of higher degree, respectively:

$$X = Z^2 / \left[ R_s + R_s \sqrt{1 - (1+K)Z^2/R_s^2} \right] + \qquad (3)$$
$$a_4 Z^4 + a_6 Z^6 + a_8 Z^8 + a_{10} Z^{10}$$

In the above, K=9.0, $a_4$=$a_8$=0/0, $a_6$=−2.0E−0.4, $a_{10}$=4.0E−04.

Further, the scanning image forming lens which is the third optical lens system has a non-arc shape in the main scanning cross section, which is expressed by the above formula (1). The coefficients of higher degree are as described above, and the cone constant of the first and second planes $K_1$ and $K_2$ are −59.97 and 4.69, respectively.

Further, the curvature of field in the sub scanning cross section at each position of the coordinate Y for the direction corresponding to the main scanning direction is expressed by the above formula (2) for each plane of the third optical lens system. For the incident plane, a=a=a= . . . =0, and for the emerging plane, $a_2$=−2.20767E−03, $b_2$=2.43846E−06, $c_2$=−2.72962E−10, $d_2$=−1.13767E−12, $e_2$=1.0764E−15, $f_2$=−3.11961E−19.

The optical arrangement from the second optical lens system to the scanning surface on the light path is substantially the same as in the first example and each distance is as follows;
S: ∞
L1: 4 mm
L2: 40 mm
L3: 33.2 mm
L4: 139.3 mm In this second example, because the distance S from the incident surface of the first lens of the second optical lens system to the natural condensing point is ∞, the light flux from the light source is converted to a parallel light flux by the first optical lens system.

The semiconductor laser of the light source and the first optical lens system functioning as the coupling lens are preferably packaged in a common aluminum tube. Because the coefficient of linear expansion of aluminum is 2.3E−05 (/° C.), assuming that the focal length of the first optical lens system is about 14.5 mm, the object point of the first optical lens system moves away from the first optical lens system by the distance of about 0.01001 mm, which is calculated by the equation of 2.3E−05×30×14.5.

The coefficient of linear expansion of other optical elements are as follows:
The first optical lens system (coupling lens): 8.6E−06
The first lens (plastic lens) of the second optical lens system: 7.0E−05
The second lens (glass lens) of the second optical lens system: 7.5E−06
The third optical lens system (scanning image forming lens): 7.0E−05

The change in the curvature of field in the sub scanning direction in the second example when the operating temperature is changed from about 20 degrees to about 50 degrees centigrade are as follows;

| Image height | 0 mm | 10 mm |
|---|---|---|
| Curvature of field change by the first optical lens system | −0.2 | −0.1 |
| Curvature of field change by the first lens of the second optical lens system | −3.1 | −2.6 |
| Curvature of field change by the second lens of the second optical lens system | 0.5 | 0.4 |
| Curvature of field change by the third optical lens system | 4.1 | 3.5 |
| Curvature of field change as the whole lens system | 1.3 | 1.2 |

Thus, although the curvature of field changes in the positive direction in the sub scanning direction due to a change of the volume of the plastic lens in the third optical lens system in accordance with the operating temperature change, because the curvature of field in the sub scanning direction changes in the negative direction due to a change in the volume of the first lens (plastic lens) of the second optical lens system in accordance with the operating temperature change, the total change in the curvature of field in the sub scanning direction of the whole optical lens system is greatly suppressed, and thereby the diameter of the optical beam spot is kept very small.

Figure 4:
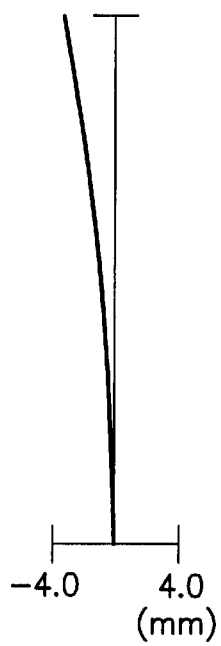
FIG. 4 is a diagram illustrating the spherical aberration of an optical beam spot at a zero image height of a comparative example for comparison to the second example of the preferred embodiments.

FIG. 3 illustrates the spherical aberration in the sub scanning cross section at the image height of 0 mm in the second example. The spherical aberration is satisfactorily and accurately corrected by forming the first plane (incident surface) of the first lens of the second optical lens system to have the non-arc shape. For comparison, the spherical aberration when the incident surface of the first lens of the second optical lens system is formed so as to have an arc shape in the sub scanning cross section is illustrated in FIG. 4.

Further, the diameter of an optical beam spot, which is defined by $1/e^2$ where "e" represents the maximum light intensity, in each of the main scanning direction and the sub scanning direction, is shown below for both cases where the incident surface of the first lens of the second optical lens system has non-arc and arc shapes, respectively in the sub scanning cross section:

| The first plane of the first lens of the second optical lens system | non-arc | | arc | |
|---|---|---|---|---|
| Image height | 0 mm | 108 mm | 0 mm | 108 mm |
| Beam spot diameter in the main scanning direction (μm) | 60.6 | 60.9 | 60.6 | 60.9 |
| Beam spot diameter in the sub scanning direction (μm) | 69.3 | 68.2 | 82.0 | 85.0 |

From this result, it can be seen that the diameter of an optical beam spot can be kept very small in the sub scanning direction by including a non-arc surface in the sub scanning cross section of a plastic lens used for the second optical lens system.

EXAMPLE 3

In the third example of the preferred embodiments of the present invention, the first plane (incident surface) of the first lens (plastic lens) of the second optical lens system has a non-arc shape in the sub scanning cross section and the cone constant and the coefficient of higher degree of the above formula (3) are set as follows:
K=9.0, $a_4=a_8=0.0$, $a_6=-2.04E-0.4$, $a_{10}=5.5E-04$ The changes in the curvature of field in the main scanning direction and the sub scanning direction due to the operating temperature change are substantially the same as in the first example and are small because the paraxial fluxes are substantially the same as in the first example.

In addition, the spherical aberration (wave front aberration) in the sub scanning direction is corrected by forming the first plane (incident surface) of the first lens of the second optical lens system to have a non-arc shape in the sub scanning cross section, and thereby, the diameter of an optical beam spot is kept small in a uniform and reliable manner.

Figure 5:
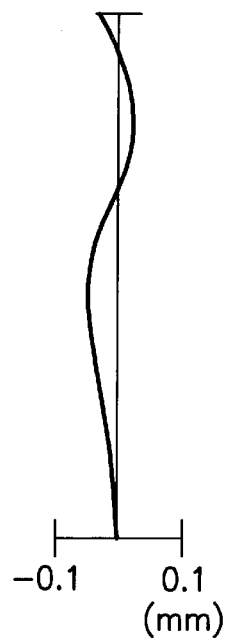
FIG. 5 is a diagram illustrating the spherical aberration of an optical beam spot at a zero image height of a third example of the preferred embodiments.
Figure 6:
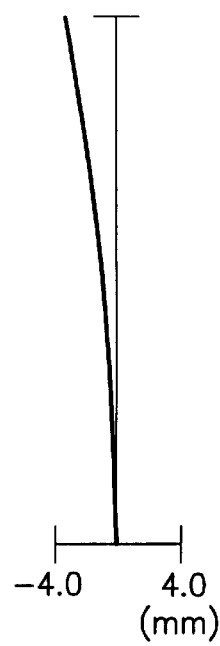
FIG. 6 is a diagram illustrating the spherical aberration of an optical beam spot at a zero image height of a comparative example for comparison to the third example.

FIG. 5 illustrates the spherical aberration (wave front aberration) in the sub scanning cross section at the image height of 0 mm of the third example. As illustrated, the spherical aberration (wave front aberration) is satisfactorily corrected. For comparison, the spherical aberration when the first plane of the first lens of the second optical lens system has an arc shape in the sub scanning cross section is illustrated in FIG. 6.

Further, the diameter of an optical beam spot, which is defined by $1/e^2$ where "e" represents the maximum light intensity, in each of the main scanning direction and the sub scanning direction, is shown below for both cases where the incident surface of the first lens of the second optical lens system is formed to have non-arc and arc shapes, respectively in the sub scanning cross section:

| The first plane of the first lens of the second optical lens system | non-arc | | arc | |
|---|---|---|---|---|
| Image height | 0 mm | 108 mm | 0 mm | 108 mm |
| Beam spot diameter in the main scanning direction (μm) | 59.8 | 60.2 | 59.9 | 60.2 |
| Beam spot diameter in the sub scanning direction (μm) | 74.8 | 73.3 | 81.9 | 84.7 |

From this result, it can be seen that the diameter of an optical beam spot can be made very small in the sub scanning direction by including a non-arc surface in the sub scanning cross section of a plastic lens used for the second optical lens system. In the third example, the non-arc shape is provided only in the sub scanning cross section of the plastic lens of the second optical lens system. However, the non-arc shape can be provided also in the main scanning cross section.

EXAMPLE 4

In the above three examples of the preferred embodiments of the present invention, the plastic lens 141 of the second optical lens system 14 has a negative power in both directions corresponding to the main scanning directions and the sub scanning directions, respectively. In the fourth example, the plastic lens 141 has a negative power only in the sub scanning direction, and further includes at least one surface having a non-arc shape in the main scanning cross section and one surface having a non-arc shape in the sub scanning cross section. The glass lens 142 of the second optical lens system 14 has a positive power at least in the direction corresponding to the sub scanning direction. The negative power of the plastic lens 141 in the direction corresponding to the sub scanning direction is weak relative to the positive power that the glass lens 142 has in the same direction and the second optical lens system 14 as a whole has a positive power in the direction corresponding to the sub scanning direction, such that the second optical lens system 14 condenses the light flux from the light source into a line image extending to the direction corresponding to the main scanning direction.

The third optical lens system 18 which functions as a scanning image forming lens includes a single plastic lens, and condenses a deflected light flux so as to form an optical beam spot on a scanning surface 20, which is a surface to be scanned. The third optical lens system 18 enables the scanning surface 20 to be scanned by the optical beam spot at constant velocity. The third optical lens system 18 further enables the line image to be formed at the position of the scanning surface 20 with the line image as the object point in the direction corresponding to the sub scanning direction. The third optical lens system 18 is preferably an anamorphic lens having a larger positive power in the direction corresponding to the sub-scanning direction than in the direction corresponding to the main scanning direction. Because the third optical lens system 18 is preferably a single plastic lens, when the operating temperature changes, the image forming position defined by the third optical lens system 18 significantly changes for both directions corresponding to the main scanning direction and the sub scanning direction, respectively.

When the operating temperature rises, the image forming position defined by the third optical lens system 18 changes in a positive direction (to the right in FIG. 1) for both directions corresponding to the main scanning direction and the sub scanning direction, respectively. Because the positive power in the sub scanning direction is large, the change in the image forming position in the direction corresponding to the sub scanning direction is large. In this fourth example, therefore, for offsetting the above change in the image forming position in the direction corresponding to the sub scanning direction caused by the change in operating temperature, the plastic lens 141 having a negative power in the direction corresponding to the sub scanning direction is used in the second optical lens system 14. The plastic lens 141 changes the image forming position in a negative direction (to the left in FIG. 1) in the direction corresponding to the sub scanning direction when the temperature rises. Accordingly, the change in the image forming position of the third optical lens system 18 in the positive direction is offset by the change in the image forming position of the plastic lens 141 to the negative direction. Thus, even when the operating temperature changes, the diameter of an optical beam spot is kept small on the scanning surface in the sub scanning direction.

The radius of curvature R, the lens thickness D, the refractive index N at an operating wave length, and the non-spherical surface coefficient of each optical lens at about 20 degrees and about 50 degrees centigrade are shown below. For each optical lens, the incident surface is indicated by a suffix "1" and the emerging surface by a suffix "2". When the radius of curvature differs between the directions corresponding to the main and sub scanning directions, respectively, the radius of curvature for the direction corresponding to the main scanning direction is indicated by a suffix "m" and the radius of curvature for the direction corresponding to the sub scanning direction by a suffix "s".

| | | 20 | 50 |
|---|---|---|---|
| Operating temperature (centigrade) | | | |
| Light source operating wave length (nm) | | 780.0 | 787.8 |
| The first optical lens system: (coupling lens) | Object point | 0 | −0.01001 |
| | $R_1$ | ∞ | ∞ |
| | $R_2$ | −9.761 | −9.763 |
| | D | 2.800 | 2.801 |
| | N | 1.675 | 1.6748 |
| The second optical lens system: (plastic lens) | $R_{1m}$ | ∞ | ∞ |
| | $R_{1s}$ | −15.00 | −15.032 |
| | $R_{2m}$ | 90.00 | 90.189 |
| | $R_{2s}$ | ∞ | ∞ |
| | D | 3.000 | 3.006 |
| | N | 1.5244 | 1.52165 |
| The second optical lens system: (glass lens) | $R_{1m}$ | ∞ | ∞ |
| | $R_{2m}$ | ∞ | ∞ |
| | $R_{1s}$ | 10.4900 | 10.4924 |
| | $R_{2s}$ | ∞ | ∞ |
| | D | 3.000 | 3.001 |
| | N | 1.511249 | 1.511160 |
| The third optical lens system: (scanning image forming lens) | $R_{1m}$ | 155.000 | 155.326 |
| | $R_{1A4}$ | −9.46500E−07 | −9.40562E−07 |
| | $R_{1A6}$ | 3.85000E−10 | 3.80983E−10 |
| | $R_{1A8}$ | −8.11300E−14 | −7.99473E−14 |
| | $R_{1A10}$ | 1.00000E−17 | 9.81297E−18 |
| | $R_{1s}$ | −88.850 | −89.037 |
| | D | 13.500 | 13.528 |
| | N | 1.524400 | 1.521650 |
| | $R_{2m}$ | −141.000 | −141.296 |
| | $R_{2A4}$ | −1.00300E−06 | −9.96708E−07 |
| | $R_{2A6}$ | 2.44000E−10 | 2.41454E−10 |
| | $R_{2A8}$ | −7.85600E−14 | −7.74148E−14 |
| | $R_{2A10}$ | 2.80000E−17 | 2.74763E−17 |
| | $R_{2s}$ | −15.220 | −15.252 |

In the above example, assuming that i=1 (incident surface) –2 (emerging surface), $R_{im}$ represents the radius of curvature or paraxial radius of curvature in the direction corresponding to the main scanning direction, $R_{is}$ represents the radius of curvature or paraxial radius of curvature in the direction corresponding to the sub-scanning direction, $R_i$ represents the radius of curvature in the coaxial surface (symmetrical shape relative to the optical axis), and $R_{iA4}$–$R_{iA10}$ represents the non-spherical surface coefficient, respectively. Further, "E and the value following E" in a numerical value represents the power of 10; e.g., "E−17" means $10^{-17}$, the numerical value being applied to the number immediately preceding it.

In the fourth example, the second surface (emerging plane) of the first optical lens system which functions as the coupling lens has a non-spherical shape.

The non-spherical shape is expressed in the following formula (4), wherein X is the coordinate in the direction of the optical axis, r is the distance from the optical axis, R is the paraxial radius of curvature, K is the cone constant, and $a_4$, $a_6$, $a_8$, $a_{10}$, . . . are coefficients of higher degree:

$$X = r^2 / \left[R + R\sqrt{\{1-(1+K)r^2/R^2\}}\right] + a_4 r^4 + a_6 r^6 + a_8 r^8 + a_{10} r^{10} \quad (4)$$

In the above, $R(=R_2)=-9.761$, K=0.27, $a_4$=1.2E−7, $a_6$=9.0E−7, $a_8$=6.5E−9, $a_{10}$=1.8E−10.

The first plane (incident surface) of the first lens (plastic lens) of the second optical lens system has a non-arc shape in the sub scanning cross section and a straight line shape in the main scanning cross section. The non-arc shape is expressed in the above formula (3), wherein $R_s(=R_{1s})=-15.00$, K=7.6, $a_4=a_6=a_8=0.0$, $a_{10}$=4.0E−7.

The second plane (emerging surface) of the first lens (plastic lens) of the second optical lens system has a non-arc shape in the main scanning cross section and a straight line shape in the sub scanning cross section. The non-arc shape is expressed in the following formula (5), wherein X is the coordinate in the direction of the optical axis, Y is the coordinate in the direction corresponding to the main scanning direction, $R_m$ is the paraxial radius of curvature, K is the cone constant, and $a_4$, $a_6$, $a_8$, $a_{10}$, . . . are coefficients of higher degree:

$$X = Y^2 / \left[R_m + R_m\sqrt{\{1-(1+K)y^2/R_m^2\}}\right] + \quad (5)$$
$$a_4 Y^4 + a_6 Y^6 + a_8 Y^8 + a_{10} Y^{10}$$

In the above, $R_m(=R_{2m})$=90.00, K=−15, $a_4$=6.5E−6, $a_6$=1.0E−6, and $a_{10}$=−0.3.0E−9.

Both incident and emerging surfaces of the scanning image forming lens which is the third optical lens system have a non-arc shape in the main scanning cross section. The non-arc shape is expressed in the above formula (1), and the cone constants $K_1$ and $K_2$ of the first and second surfaces of the scanning image forming lens serving as the third optical lens system are −59.97 and 4.69, respectively.

Further, the radius of curvature in the sub scanning cross section plane of the third optical lens system (scanning image forming lens) at each position of the coordinate Y in the direction corresponding to the main scanning direction is expressed by the above polynomial (2), wherein $R_{is}$ is the radius curvature when Y=0, and $R_{1s}$=−88.50 and $R_{2s}$=−15.220 at the operating temperature of about 20 degrees centigrade.

In the incident surface (i=1) of the third optical lens system, a1=b1=c1= . . . =0, that is, the radius of curvature in the cross section in the sub scanning direction does not change, and in the emerging surface (i=2), $a_2$=−2.2076E−03, $b_2$=2.43846E−06, $c_2$=−2.72962E−10, $d_2$=−1.13767E−12, $e_2$=1.0764E−15, $f_2$=−3.11961E−19.

The optical arrangement on the light path from the second optical lens system to the scanning surface is defined by the following values, wherein "S" is the distance from the incident surface of the first lens of the second optical lens system to the natural condensing point of the light flux launched into the first lens of the second optical lens system, "L1" is the distance from the emerging surface of the first plastic lens of the second optical lens system to the incident surface of the second glass lens of the second optical lens system, "L2" is the distance from the emerging surface of the second lens of the second optical lens system to the deflecting reflective surface of the optical deflector, "L3" is the distance from the deflecting reflective surface of the deflector to the incident surface of the third optical lens system (the scanning image forming lens) and "L4" is the distance from emerging surface of the second lens of the third optical lens system to the scanning surface, respectively;

S: 174.3 mm
L1: 4 mm
L2: 40 mm
L3: 33.2 mm
L4: 139.3 mm

The semiconductor laser of the light source and the first optical lens system which functions as the coupling lens are preferably packaged in a common aluminum tube. Because the coefficient of linear expansion of aluminum is 2.3E−05 (/° C.), assuming that the focal length of the first optical lens system is about 14.5 mm, the object point of the first optical lens system moves away from the first optical lens system by the distance of about 0.01001 mm, which is calculated by the equation of 2.3E−05×30×14.5.

The coefficient of linear expansion of other optical elements are as follows:

The first optical lens system (coupling lens): 8.6E−06
The first lens (plastic lens) of the second optical lens system: 7.0E−05
The second lens (glass lens) of the second optical lens system: 7.5E−06
The third optical lens system (scanning image forming lens): 7.0E−05

FIG. 7 illustrates the curvature of field and the constant velocity characteristics of the fourth example at an operating temperature of about 20 degrees centigrade. As illustrated, both the curvature of field and the constant velocity characteristics are satisfactorily corrected.

The change in the curvature of field in the main scanning direction and the sub scanning direction in the fourth example when the operating temperature is changed from about 20 degrees to about 50 degrees centigrade are as follows;

|  | 0 mm | | 108 mm | |
|---|---|---|---|---|
| Image height | main | sub | main | sub |
| Curvature of field change by the first optical lens system | −0.1 | −0.1 | −0.1 | −0.1 |
| Curvature of field change by the first lens of the second optical lens system | −0.9 | −3.3 | −0.6 | −2.7 |
| Curvature of field change by the second lens of the second optical lens system | 0.0 | 0.4 | 0.0 | 0.4 |
| Curvature of field change by the third optical lens system | 1.1 | 4.1 | 1.0 | 3.5 |
| Curvature of field change as the whole lens system | 0.1 | 1.1 | 0.3 | 1.1 |

Thus, although the curvature of field changes in the positive direction both in the main scanning direction and the sub scanning direction caused by a change in the volume of the scanning image forming lens according to the operating temperature change, because the curvature of field changes in the negative direction due to a change in the first lens (plastic lens) of the second optical lens system according to the operating temperature change, the total change in the curvature of field of the whole optical lens system is suppressed in both of the main scanning direction and the sub scanning direction. That is, the change in the curvature of field in the sub scanning direction is suppressed even when the first lens (plastic lens) of the second optical lens system does not have a negative power in the main scanning direction.

Further, in this fourth example of the preferred embodiments, the first lens (plastic lens) of the second optical lens system has a non-arc shape in both the main and sub scanning cross sections, respectively. Therefore, the spherical aberration of the whole optical system is excellently corrected in both the main scanning direction and the sub scanning direction, and thereby the diameter of an optical beam spot is kept small.

FIG. 7 illustrates the spherical aberration of the fourth example in the sub scanning cross section, and FIG. 8 illustrates the spherical aberration of a comparative example 1 of the fourth example in the sub scanning direction, in which the first lens of the second optical lens system has an arc shape in both the main scanning section and the sub scanning cross section. Further, FIG. 9 illustrates the spherical aberration of the fourth example in the main scanning direction, and FIG. 10 illustrates the spherical aberration of the above comparative example 1 in the main scanning direction.

The diameter of an optical beam spot at the image height of 0 mm, which is defined by $1/e^2$ where "e" represents the maximum light intensity, in each of the main and sub scanning directions, is shown below for each of the fourth example, the comparative example 1 and a comparative example 2 of the fourth example, in which the first lens of the second optical lens system has an arc shape in the main scanning cross section:

|  | Fourth example | Comparative example 1 | Comparative example 2 |
|---|---|---|---|
| Beam spot diameter in the main scanning direction ($\mu$m) | 35 | 37 | 37 |
| Beam spot diameter in the sub scanning direction ($\mu$m) | 67 | 70 | 67 |

From this result, it can be said that the diameter of an optical beam spot can be kept small by forming the first lens (plastic lens) of the second optical lens system to have a non-arc shape in both of the main scanning cross section and sub scanning cross section.

EXAMPLE 5

The fifth example of the preferred embodiments is described next.

The radius of curvature R, the lens thickness D, the refractive index N at an operating wave length, and the non-spherical surface coefficient of each optical lens at about 20 degrees and about 50 degrees centigrade are shown below in a similar manner as in the Example 1.

| Operating temperature (centigrade) | | 20 | 50 |
|---|---|---|---|
| Light source operating wave length (nm) | | 780.0 | 787.8 |
| The first optical lens system: (coupling lens) | Object point | 0 | −0.01001 |
| | $R_1$ | ∞ | ∞ |
| | $R_2$ | −9.761 | −9.763 |
| | D | 2.800 | 2.801 |
| | N | 1.675 | 1.6748 |
| The second optical lens system: (plastic lens) | $R_{1s}$ | −14.80 | −14.831 |
| | $R_2$ | 90 | 90.189 |
| | D | 3.000 | 3.006 |
| | N | 1.5244 | 1.52165 |
| The second optical lens system: (glass lens) | $R_{1m}$ | ∞ | ∞ |
| | $R_{2m}$ | ∞ | ∞ |
| | $R_{1s}$ | 9.520 | 9.5221 |
| | $R_{2s}$ | ∞ | ∞ |
| | D | 3.000 | 3.001 |
| | N | 1.511249 | 1.511160 |
| The third optical lens system: (scanning image forming lens) | $R_{1m}$ | 155.000 | 155.326 |
| | $R_{1A4}$ | −9.46500E−07 | −9.40562E−07 |
| | $R_{1A6}$ | 3.85000E−10 | 3.80983E−10 |
| | $R_{1A8}$ | −8.11300E−14 | −7.99473E−14 |
| | $R_{1A10}$ | 1.00000E−17 | 9.81297E−18 |
| | $R_{1s}$ | −88.850 | −89.037 |
| | D | 13.500 | 13.528 |
| | N | 1.524400 | 1.521650 |
| | $R_{2m}$ | −141.000 | −141.296 |
| | $R_{2A4}$ | −1.00300E−06 | −9.96708E−07 |
| | $R_{2A6}$ | 2.44000E−10 | 2.41454E−10 |

-continued

| | | |
|---|---|---|
| $R_{2A8}$ | −7.85600E−14 | −7.74148E−14 |
| $R_{2A10}$ | 2.80000E−17 | 2.74763E−17 |
| $R_{2s}$ | −15.220 | −15.252 |

The second plane (emerging surface) of the first optical lens system is formed to have a non-spherical shape symmetrically relative to the optical axis, which is defined by the above formula (4), wherein $R(=R_2)=90$, $K=0.27$, $a_4=1.2E-4$, $a_6=9.0E-7$, $a_8=6.5E-9$, $a_{10}=1.8E-10$.

The first plane of the first lens (plastic lens) of the second optical lens system has a non-arc shape in the sub scanning cross section and a straight line shape in the main scanning direction, and the non-arc shape is defined by the above formula (5), wherein $R_s(=R_{1s})=-14.80$, $K=10.1$, $a_4=a_6=a_8=a_{10}=0.0$.

The second plane (emerging surface) of the first lens of the second optical lens system has a non-spherical shape symmetrically relative to the optical axis, which is defined by the above formula (4) wherein $R(=R_2)=90$, $K=-15$, $a_4=6.5E-6$, $a_6=1.0E-6$, $a_{10}=-3.0E-9$.

The single plastic lens constituting the scanning image forming lens is substantially the same as in the fourth example and the shape of the first plane (incident surface) and the second plane (emerging surface) are defined by the formula (1) wherein $K_1=-59.97$ and $K_2=4.69$, and the coefficient of higher degree is zero. Further, the radius of curvature in the sub scanning cross section is defined by the formula (2) wherein $a_1=b_1=c_1=\ldots=0$ (the radius of curvature does not change in the sub scanning cross section regardless of the position in the sub scanning cross section), and for the emerging plane (i=2), $a_2=-2.20767E-03$, $b_2=2.43846E-06$, $c_2=-2.72962E-10$, $d_2=-1.13767E-12$, $e_2=1.0764E-15$, $f_2=-3.11961E-19$.

The optical arrangement on the light path from the second optical lens system to the scanning surface is defined by the following values, wherein "S" is the distance from the incident surface of the first lens of the second optical lens system to the natural condensing point of the light flux launched into the first lens of the second optical lens system, "L1" is the distance from the emerging surface of the first lens of the second optical lens system to the incident surface of the second lens of the second optical lens system, "L2" is the distance from the emerging surface of the second lens of the second optical lens system to the deflecting reflective surface of the optical deflector, "L3" is the distance from the deflecting reflective surface of the deflector to the incident surface of the third optical lens system (the scanning image forming lens) and "L4" is the distance from the emerging surface of the third optical lens system to the scanning surface, respectively;

S: ∞ (i.e., the light flux is parallel)
L1: 4 mm
L2: 40 mm
L3: 33.2 mm
L4: 139.3 mm The semiconductor laser of the light source and the first optical lens system which functions as the coupling lens are preferably packaged in a common aluminum tube. Because the coefficient of linear expansion of aluminum is 2.3E−05 (/° C.), assuming that the focal length of the first optical lens system is about 14.5 mm, the object point of the first optical lens system moves away from the first optical lens system by the distance of about 0.01001 mm, which is calculated by the equation of 2.3E−05×30×14.5, when the operating temperature rises to about 30 degrees.

The coefficient of linear expansion of the other optical elements are as follows:

The first optical lens system (coupling lens): 8.6E−06

The first lens (plastic lens) of the second optical lens system: 7.0E−05

The second lens (glass lens) of the second optical lens system: 7.5E−06

The third optical lens system (scanning image forming lens): 7.0E−05

FIG. 11 illustrates the curvature of field and the constant velocity characteristics of the fifth example at an operating temperature of about 20 degrees centigrade. As illustrated, both the curvature of field and the constant velocity characteristics are accurately and satisfactorily corrected.

The change in the curvature of field in the main scanning direction and the sub scanning direction in the fifth example when the operating temperature is changed from about 20 degrees to about 50 degrees centigrade are as follows;

| | 0 mm | | 108 mm | |
|---|---|---|---|---|
| Image height | main | sub | main | sub |
| Curvature of field change by the first optical lens system | −0.1 | −0.1 | −0.1 | −0.1 |
| Curvature of field change by the first lens of the second optical lens system | −0.9 | −3.7 | −0.6 | −3.1 |
| Curvature of field change by the second lens of the second optical lens system | 0.0 | 0.5 | 0.0 | 0.4 |
| Curvature of field change by the third optical lens system | 1.1 | 4.1 | 1.0 | 3.5 |
| Curvature of field change as the whole lens system | 0.1 | 0.8 | 0.3 | 0.7 |

Thus, although the curvature of field changes in the positive direction both in the main scanning direction and the sub scanning direction due to a change in the scanning image forming lens in accordance with the operating temperature change, because the curvature of field changes in the negative direction both in the main scanning direction and the sub scanning direction due to a change in the first lens of the second optical lens system in accordance with the operating temperature change, the total change in the curvature of field of the whole optical lens system is suppressed in both the main scanning direction and the sub scanning direction.

Figure 12:
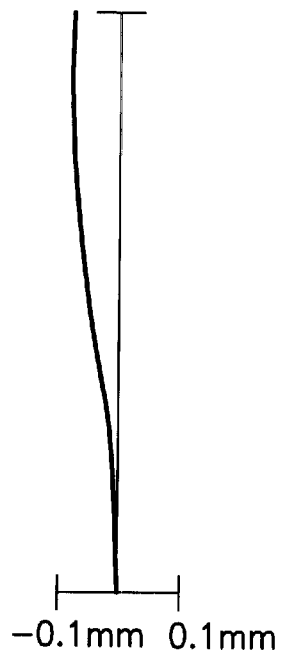
FIG. 12 is a diagram illustrating the spherical aberration embodiments in the sub scanning cross section of a fifth example of the preferred.
Figure 13:
FIG. 13 is diagram illustrating the spherical aberration in the main scanning cross section of a comparative example 3 for comparison to the fifth example.

FIG. 12 illustrates the spherical aberration of the fifth example in the sub scanning direction, and FIG. 13 illustrates the spherical aberration of a comparative example 3 for comparison to the fifth example in the sub scanning cross section, in which the first lens of the second optical lens system has an arc shape in both the main scanning cross section and the sub scanning cross section. The spherical aberration of the fifth example in the main scanning direction is substantially the same as illustrated in FIG. 10.

The diameter of an optical beam spot at the image height of 0 mm, which is defined by $1/e^2$ where "e" represents the maximum light intensity, in each of the main and sub scanning directions, is shown below for each of the fifth example and the comparative example 3 for comparison to the fifth example:

|  | Fifth example | Comparative example 3 |
|---|---|---|
| Beam spot diameter in the main scanning direction ($\mu$m) | 35 | 37 |
| Beam spot diameter in the sub scanning direction ($\mu$m) | 67 | 70 |

From this result, it can be seen that the diameter of an optical beam spot can be made small by forming the first plane of the first lens (plastic lens) of the second optical lens system to have a non-arc shape in the sub scanning cross section and the second plane to have a non-spherical shape symmetrically relative to the optical axis. In addition, by configuring the second plane of the plastic lens so as to be symmetrical relative to the optical axis, an optical scanning image forming apparatus having a large eccentric tolerance can be realized.

While the invention has been particularly shown and described with reference to preferred embodiments thereof, additional modifications and variations are possible in light of the above teachings. Therefore, it is to be understood that within the scope of the appended claims, the present invention may be practiced otherwise than as specifically described herein.

What is claimed is:

1. An optical scanning apparatus for optically scanning a surface to be scanned at a constant velocity, the optical scanning apparatus comprising:
    a light source for emitting a light flux;
    a first optical lens system for coupling the light flux emitted by the light source to a following optical lens system;
    a second optical lens system having a negative power in the main scanning direction, for forming the light flux from the first optical lens system into a line image extending in a direction corresponding to a main scanning direction of the surface to be scanned which is perpendicular to a sub scanning direction;
    an optical deflector for deflecting the light flux formed as the line image via a deflecting reflective plane thereof, which is located near where the line image is formed; and
    a third optical lens system having a positive power in the main scanning direction, for condensing the deflected light flux as an optical beam spot on the surface to be scanned;
    wherein the second optical lens system includes:
        a glass lens, and
        at least one plastic lens having a non-arc shape and providing the negative power of the second optical lens system in the main scanning direction;
    wherein the third optical lens system includes:
        a plastic lens providing the positive power of the third optical lens system in the main scanning direction; and
    wherein a surface of the at least one plastic lens of the second optical lens system is configured such that a change in a curvature of field in directions corresponding to the main and sub scanning directions, respectively, which is caused by a change in the plastic lens of the third optical lens system due to changes in an operating temperature, is compensated.

2. The optical scanning apparatus according to claim 1, wherein the non arc shape of the at least one plastic lens is disposed in the sub scanning direction.

3. The optical scanning apparatus according to claim 1, wherein the non arc shape of the at least one plastic lens is disposed in the sub scanning direction and in the main scanning direction.

4. The optical scanning apparatus according to claim 1, wherein the glass lens of the second optical lens system does not have a non-arc shape.

5. The optical scanning apparatus according to claim 1, wherein the at least one plastic lens of the second optical lens system has a negative power in the main scanning direction.

6. The optical scanning apparatus according to claim 1, wherein the glass lens of the second optical system has no power in the main scanning direction.

7. The optical scanning apparatus according to claim 1, wherein the at least one plastic lens includes a first surface and a second surface, wherein the non-arc shape is located on the first surface of the at least one plastic lens.

8. The optical scanning apparatus according to claim 1, wherein the at least one plastic lens includes a first surface and a second surface, wherein the non-arc shape is located on the second surface of the at least one plastic lens.

9. The optical scanning apparatus according to claim 1, wherein the second lens system has negative power in the main scanning direction.

10. The optical scanning apparatus according to claim 1, wherein at least one plastic lens of the second optical lens system is configured to have a power which is the reverse of a power of the third optical lens system.

11. The optical scanning apparatus according to claim 1, wherein the non-arc shape of the at least one plastic lens of the second optical lens system decreases spherical aberration effects attributable to said first, second, and third optical lens systems.

12. An image forming apparatus for forming an image by optically scanning a surface to be scanned at a constant velocity, the image forming apparatus comprising:
    a light source for emitting a light flux;
    a first optical lens system for coupling the light flux emitted by the light source to a following optical lens system;
    a second optical lens system having a negative power in the main scanning direction, for forming the light flux from the first optical lens system into a line image extending in a direction corresponding to a main scanning direction of the surface to be scanned which is perpendicular to a sub scanning direction;
    an optical deflector for deflecting the light flux formed as the line image via a deflecting reflective plane thereof, which is located near where the line image is formed; and
    a third optical lens system having a positive power in the main scanning direction, for condensing the deflected light flux as an optical beam spot on the surface to be scanned;
    wherein the second optical lens system includes:
        a glass lens, and
        at least one plastic lens having a non-arc shape and providing the negative power of the second optical lens system in the main scanning direction;
    wherein the third optical lens system includes:
        a plstic lens providing the positive power of the third optical lens system in the main scanning direction; and wherein a surface of the at least one plastic lens of the second optical lens system is configured such that a change in a curvature of field in directions corresponding to the main and sub scanning directions, respectively, which is caused by a change in the plastic lens of the third optical lens system due to changes in an operating temperature, is compensated.

13. A method of manufacturing an optical scanning apparatus, the method comprising the steps of:

providing a light source for emitting a light flux;

arranging a first optical lens system so as to couple the light flux emitted by the light source to a following optical lens system;

forming a second optical lens system having a negative power in the main scanning direction, to include a glass lens and at least one plastic lens having a non-arc shape;

arranging the second optical lens system following the first optical lens system such that the second optical lens system forms the light flux from the first optical lens system into a line image extending in a direction corresponding to a main scanning direction of the surface to be scanned which is perpendicular to a sub scanning direction, wherein the at least one plastic lens of the second optical lens system provides negative power of the second optical lens system in the main scanning direction;

arranging an optical deflector so as to deflect the light flux formed as the line image via a deflecting reflective plane thereof, which is located near where the line image is formed;

arranging a third optical lens system having a positive power in the main scanning direction, so as to condense the deflected light flux as an optical beam spot on the surface to be scanned, with the third optical lens system having a plastic lens providing the positive power of the third optical lens system in the main scanning direction; and configuring a surface of the at least one plastic lens of the second optical lens system such that a change in a curvature of field in directions corresponding to the main and sub scanning directions, respectively, which is caused by a change in the plastic lens of the third optical lens system due to changes in an operating temperature, is compensated.

14. An optical scanning apparatus for optically scanning a surface to be scanned at a constant velocity, the optical scanning apparatus comprising:

means for emitting a light flux;

means for coupling the light flux emitted by said means for emitting a light flux to means for forming the light flux into a line image;

light flux forming means having a negative power in the main scanning direction, for forming the light flux received from the means for coupling the light flux into a line image extending in a direction corresponding to a main scanning direction of the surface to be scanned which is perpendicular to a sub scanning direction, the means for forming the light flux including:

a glass lens and a plastic lens having a non-arc shape, the plastic lens providing the negative power of the light flux forming means in the main scanning direction;

means for deflecting the light flux formed as the line image via a deflecting reflective plane thereof, which is located near where the line image is formed; and condensing means having a positive power in the main scanning direction, for condensing the deflected light flux as an optical beam spot on the surface to be scanned, the condensing means including:

a plastic lens providing the positive power of the condensing means in the main scanning direction;; and wherein a surface of the plastic lens of the means for forming the light flux into the line image is configured such that a change in a curvature of field in directions corresponding to the main and sub scanning directions, respectively, which is caused by a change in the plastic lens of the condensing means due to changes in an operating temperature, is compensated.

15. An image forming apparatus for forming an image by optically scanning a surface to be scanned at a constant velocity, the image forming apparatus comprising:

means for emitting a light flux;

means for coupling the light flux emitted by the means for emitting a light flux to means for forming the light flux into a line image;

light flux forming means having a negative power in the main scanning direction, for forming the light flux received from the means for coupling the light flux into a line image extending in a direction corresponding to a main scanning direction of the surface to be scanned which is perpendicular to a sub scanning direction, the means for forming the light flux including:

a glass lens and a plastic lens having a non-arc shape, the plastic lens providing the negative power of the light flux forming means in the main scanning direction;

means for deflecting the light flux formed as the line image via a deflecting reflective plane thereof, which is located near where the line image is formed; and condensing means having a positive power in the main scanning direction, for condensing the deflected light flux as an optical beam spot on the surface to be scanned, the condensing means including:

a plastic lens providing the positive power of the condensing means in the main scanning direction; and wherein a surface of the plastic lens of the means for forming the light flux into the line image is configured such that a change in a curvature of field in directions corresponding to the main and sub scanning directions, respectively, which is caused by a change in the plastic lens of the condensing means due to changes in an opening temperature, is compensated.

* * * * *